United States Patent [19]

Nakamura

[11] Patent Number: 4,733,575
[45] Date of Patent: Mar. 29, 1988

[54] VEHICLE TILT STEERING COLUMN DEVICE INCLUDING A BENDING BRACKET TYPE ENERGY ABSORBING MEANS

[75] Inventor: Shuji Nakamura, Toyota, Japan

[73] Assignee: Toyota Jidosha Kabushiki Kaisha, Toyota, Japan

[21] Appl. No.: 39,433

[22] Filed: Apr. 17, 1987

[51] Int. Cl.⁴ ............................................. B62D 1/18
[52] U.S. Cl. ..................................... 74/493; 280/775; 280/777
[58] Field of Search ................. 74/492, 493; 280/775, 280/777

[56] References Cited

U.S. PATENT DOCUMENTS 4,041,796  8/1977  Shishido .............................. 74/493
4,273,005  6/1981  Strutt ................................ 74/493 X
4,330,139  5/1982  Katayama ........................ 74/493 X

FOREIGN PATENT DOCUMENTS 60-6670  1/1985  Japan .

Primary Examiner—Allan D. Herrmann
Attorney, Agent, or Firm—Oblon, Fisher, Spivak, McClelland & Maier

[57] ABSTRACT

A tilt steering column device includes a column tube assembly which comprises a lower column tube and an upper column tube. The column tube assembly is supported by a tilt center and tilt-lock means. A collar is provided at the tilt-lock means, and a guide bracket including an inclined surface and a holding support are fixed to an upper column tube. The collar has a front leg which is vertically held by the inclined surface and the holding support. By this structure, the column tube assembly can be vertically supported directly by the tilt-lock means without the intermediary of an energy absorbing bending bracket whereby the rigidity of the steering column is increased. The inclination of the inclined surface is near to the direction of the axis of the column tube assembly and thus the movement of the upper column tube is directed in the direction near to the axis of the column tube assembly. As a result, a degree of movement of the upper column tube is increased because the upper column tube does not interfere with the collar and the amount of an energy absorbed by the energy absorbing bending bracket is increased.

7 Claims, 10 Drawing Figures

VEHICLE TILT STEERING COLUMN DEVICE INCLUDING A BENDING BRACKET TYPE ENERGY ABSORBING MEANS

BACKGROUND OF THE INVENTION

1. Field of the Invention

The present invention relates to a tilt steering column for a vehicle and more specifically relates to a tilt steering column using a bending bracket as an energy absorbing means.

2. Description of the Related Art

Steering columns for vehicles can be classified into two types: a non-tilt type steering column, and a tilt type steering column in which an inclination of a steering column tube assembly with respect to a vehicle body can be adjusted.

When a driver strongly strikes a steering wheel at the time of a front end impact on a vehicle, an upper column tube which supports a steering shaft connected to the steering wheel is required to move frontward in the axial direction so as to reduce the impact force on the driver from the steering wheel and to protect the driver from injury.

A well-known means for effectively reducing the impact force is an energy absorbing bending bracket which deforms when the upper column tube moves frontward and absorbs a large amount of energy through the permanent deformation thereof. FIG. 10 shows a typical conventional bending bracket 102 which is used for a conventional non-tilt steering column 100. The energy absorbing bending bracket 102 is fixed to a column tube 104 at one end thereof and is fixed to a vehicle body 106 at the other end thereof. When a steering wheel 108 receives an excessively large frontward force P' from a driver, the energy absorbing bending bracket 102 deforms in the direction of arrow A from the position shown by a full line to the position shown by a two-dotted line in FIG. 10 and absorbs energy.

Japanese Utility Model Publication SHO No. 60-6670 discloses a typical conventional tilt steering column device which has no energy absorbing bending bracket.

FIGS. 6-9 show a hypothetical tilt steering column device with a bending bracket which might be obtained if one were to combine the tilt steering column device of SHO 60-6670 and the energy absorbing bending bracket of FIG. 10. Although the tilt steering column with an energy absorbing bending bracket of FIGS. 6-9 does not constitute prior art with respect to the present application, the tilt steering column device of FIGS. 6-9 illustrates the problems arising in the design of a conventional tilt steering column device using an energy absorbing bending bracket.

In the hypothetical tilt steering column device 110 of FIGS. 6-9, a steering column tube assembly 118 is supported by a tilt-lock means 114 which is fixed to a vehicle body 112. When the tilt-lock means 114 is unlocked by rotating a tilt lever 116 in an unlocking direction B from a position shown by a full line to a position shown by a two-dotted line in FIG. 6, the column tube 118 can tilt around a tilt center 120 in a direction C in FIG. 6. An energy absorbing bending bracket 122 extends from a first fixing portion where the bending bracket 122 is fixed to the column tube 118 to a second fixing portion where the bending bracket 122 is fixed to the tilt-lock means 114. When an upper column tube 118b moves relative to a lower column tube 118a at a time of a front impact on the vehicle, the energy absorbing bending bracket 122 absorbs energy by deforming permanently. An attachment 150 is fixed to the energy absorbing bracket 122 and a collar 126 is fixed to the attachment 150. The assembly of the energy absorbing bending bracket 122, the attachment 150 and the collar 126 is so supported by the tilt-lock means 114, via a vertically elongate hole 128 formed in the tilt-lock means 114 and a lock bolt 130 passing through the long hole 114, that the tilt-lock means 114 can be locked/unlocked by tightening/loosening the lock bolt 130 due to rotation of the tilt lever 116.

However, in the hypothetical steering column device of FIGS. 6-9, there arise the following two problems.

The first problem relates to a low rigidity of the support of the column tube assembly 118 in the vertical direction. When a driver gets into the vehicle cabin, he may hold the steering wheel to support his body and may push the steering wheel downward. When the steering wheel 132 receives such a normal downward force D as shown in FIG. 8, a bending moment M will occur around the tilt-lock means 114 and, as a result, the column tube assembly 118 often undesirably slips downward from a position shown by a full line to a position shown by a two-dotted line in FIG. 8. Further, since the column tube assembly 118 is supported in the vertical direction by the energy absorbing bending bracket 122 and the tilt-lock means 114, and since the rigidity of the energy absorbing bending bracket 122 itself is not great, the rigidity in the vertical direction of an entire steering column device including the support for the column tube assembly can not be designed to be large and thus vibration of the column tube assembly becomes a problem.

The second problem relates to a small frontward movement of the upper column tube 118b. When the steering wheel 132 receives an excessively large frontward force P shown in FIG. 6 from a driver at the time of a front impact on a vehicle, the column tube assembly 118 will also be pushed upward in the direction E shown in FIG. 9 from a position shown by a full line to a position shown by a two-dotted line in FIG. 9. As a result, interference between the column tube assembly 118 and the collar 126 will occur at a position S in FIG. 9, and such interference will prevent the upper column tube 118b from moving by a sufficient distance and will prevent the energy absorbing bending bracket 122 from deforming sufficiently to absorb a large amount of energy.

SUMMARY OF THE INVENTION

An object of the present invention is to increase the rigidity in the vertical direction of a tilt steering column device using an energy absorbing bending bracket, thereby decreasing vibration of the steering column device.

Another object of the present invention is to make the direction of a frontward movement of an upper column tube approach the direction of an axis of the steering column assembly, thereby allowing the upper column tube to move over a large distance without interfering with the collar of the tilt-lock means so that an energy absorbing bending bracket can deform sufficiently and can absorb a large amount of energy.

The above objects can be carried out by a tilt steering column device including a bending bracket type energy absorbing means for a vehicle according to the present invention.

The tilt steering column device according to the present invention comprises:

(a) a column tube assembly including a lower column tube and an upper column tube which are mutually mounted such that the upper column tube can move axially frontward with respect to the lower column tube when the upper column tube receives an excessively large frontward force;

(b) lower support bracket means for so supporting the column tube assembly at the lower column tube that the column tube assembly can tilt around a tilt center, the lower support bracket means being fixed to a vehicle body;

(c) tilt-lock means for locking/unlocking the tilting position of the column tube assembly, the tilt-lock means being fixed to the vehicle body and including means having an elongate hole and a lock bolt slidably passing through said elongate hole, the tilt-lock means comprising means for so supporting the column tube assembly at the upper column tube that the column tube assembly can tilt around the tilt center when the lock bolt is loosened and that a tilting position of the column tube assembly is locked when the lock bolt is tightened;

(d) return spring means for so supporting the column tube assembly that the column tube assembly does not freely rotate downward due to gravity when the lock bolt is loosened, the return spring means comprising a spring engaging the tilt lock means and the column tube assembly;

(e)

(e-1) an energy absorbing bending bracket for absorbing energy by a permanent deformation thereof when the upper column tube moves axially frontward with respect to the lower column tube, the energy absorbing bending bracket having one end fixed to the upper column tube, (e-2) an attachment being fixed to an other end of the energy absorbing bending bracket and means including the lock bolt for releasably supporting said attachment by the tilt-lock means such that relative movement of the attachment with respect to the tilt-lock means during tilting of the column tube assembly is accomplished by loosening the lock bolt, (e-3) a collar fixed to the attachment; and (f)

(f-1) a guide bracket fixed to the upper column tube, the guide bracket including an inclined surface, an angle defined between the inclined surface and an axis of the column tube assembly being smaller than an angle defined between the direction of an initial stage of movement of the upper column tube due to the excessively large frontward force and the axis of the column tube assembly, (f-2) a holding support being fixed to the guide bracket, said collar being vertically held between the holding support and the guide bracket, said guide bracket being positioned relative to said tilt lock-lock means such that the collar slides along the inclined surface of the guide bracket during said axially frontward movement of said upper column tube.

Effects obtained by such a tilt steering column device are as follows.

For the purpose of increasing the rigidity of the tilt steering column device in the vertical direction, it will be effective to support the column tube assembly directly by the tilt-lock means. However, such a direct support of the column tube assembly by the tilt-lock means requires such a design that the upper column tube does not interfere with the tilt-lock means when the upper column tube moves frontward while receiving an excessively large frontward force at the time of a front impact on a vehicle.

By analyzing the relationship between the direction of such an excessively large frontward force on a column tube assembly from a driver and the direction of a frontward movement of an upper column tube, it was found that, when the steering wheel receives the frontward force from a driver and the upper column tube is pushed frontward, a large upward force is produced by the energy absorbing bending bracket during an initial movement of the upper column tube. As a result, the pushing force on the column tube assembly at an initial movement of the upper column tube is directed more upward than the direction of the input force on the column tube assembly from a driver. Thus, the conventional column tube assembly of FIGS. 6–9 will be raised upward before the upper column tube has moved over a sufficient distance and will interfere with the collar. For the purpose of preventing occurrence of such interference, an effort was made as to make the direction of the stroke of the upper column tube nearer to the direction of the axis of the column tube assembly than the direction of the input force on the column tube assembly from the driver. More specifically, in the present invention, the collar which is supported by a member fixed to the vehicle body is adapted to slidably contact the inclined surface of the guide bracket which is supported by upper column tube, whereby the direction of the stroke of the upper column tube is nearer to the direction of the axis of the column tube assembly through direction control by the inclined surface. Thus, the upper column tube moves in the direction near to the direction of the axis of the column tube assembly and can move over a large distance without interfering with the collar. Such a large movement of the upper column tube makes it possible for the energy absorbing bending bracket to deform sufficiently and to absorb a large amount of energy.

Further, since the collar which is supported by the member fixed to the vehicle body is slidably held between the guide bracket and the holding support which are connected to the upper column tube, the column tube assembly is vertically supported directly by the tilt-lock means without the intermediary of the energy absorbing bending bracket. As a result, the rigidity of the steering column device is increased to a great extent. In spite of direct contact of the guide bracket with the collar, since the distance between the holding support and the inclined surface of the guide bracket is increased in the direction toward the collar and the energy absorbing bending bracket, the upper column tube can move frontward when receiving an excessively large frontward force with a smooth disengagement of the inclined surface from the collar.

BRIEF DESCRIPTION OF THE DRAWINGS

These and other objects and other advantages of the present invention will become apparent and more readily appreciated from the following detailed description of the presently preferred exemplary embodiment of the invention taken in conjunction with the accompanying drawings, in which.

DETAILED DESCRIPTION OF THE PREFERRED EMBODIMENT

Figure 1:
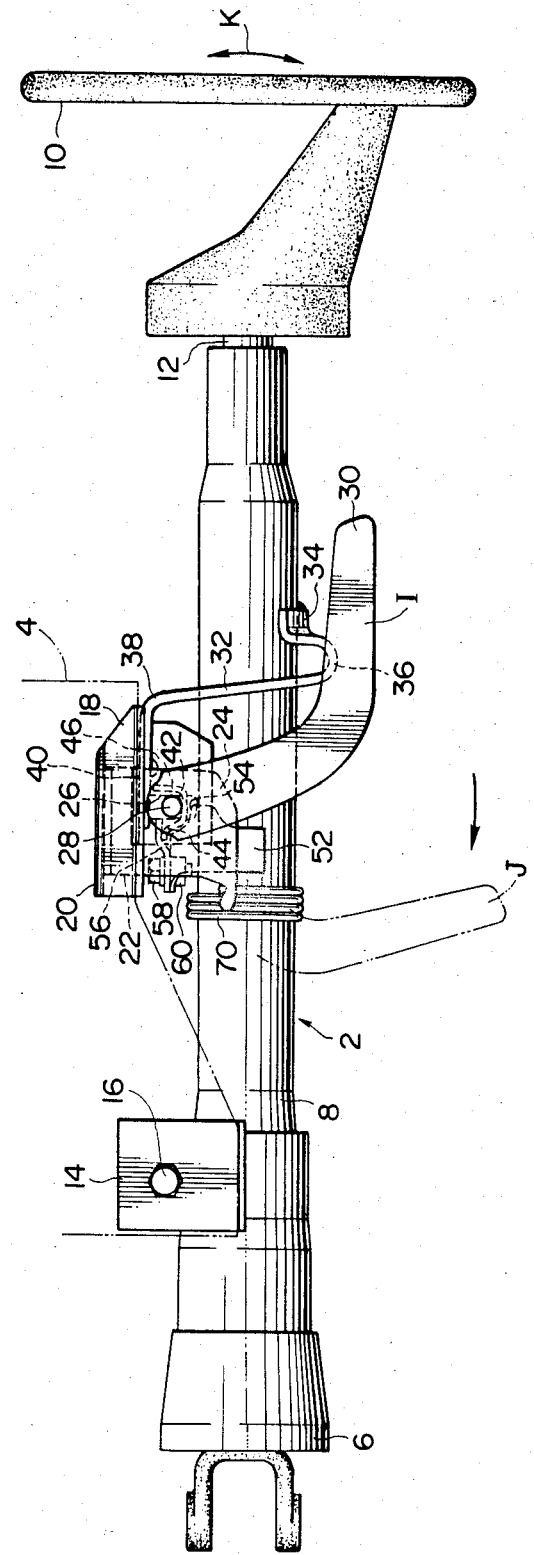
FIG. 1 is a side view of a tilt steering column device including a bending bracket type energy absorbing means for a vehicle according to one embodiment of the present invention.
Figure 2:
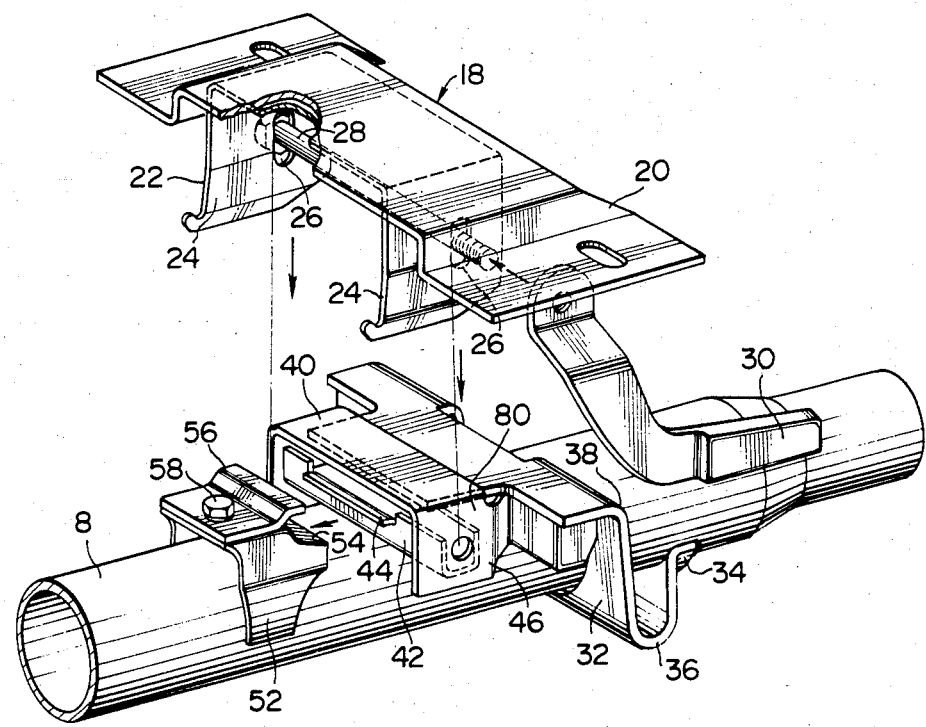
FIG. 2 is an oblique disassembled view of a tilt-lock means and the vicinity thereof in the device of FIG. 1.

FIGS. 1–10 show one preferred embodiment of the present invention. A column tube assembly 2 of a tilt steering column device is so supported by a vehicle body 4 as to tilt. The column tube assembly 2 comprises a lower column tube 6 and an upper column tube 8 which is so supported by the lower column tube 6 as to be able to move axially frontward with respect to the lower column tube 6 when the upper column tube 8 receives an excessively large frontward force. A steering shaft 12 having a steering wheel 10 is so supported by the upper column tube 8 as to smoothly rotate around the axis of the column tube assembly 2 but as not to move in the axial direction thereof relative to the upper column tube 8.

The lower column tube 6 is so supported by a lower support bracket 14 which is fixed to the vehicle body 4 that the column tube assembly 2 can tilt around a tilt center 16. The lower column tube 6 can not move axially with respect to the tilt center 16, while the upper column tube 8 and the steering shaft 12 which is supported by the upper column tube 8 can move in the axial direction with respect to the tilt center 16.

A tilt-lock means 18 for locking/unlocking the tilting position of the column tube assembly 2 is provided above the upper column tube 8 and is fixed to the vehicle body 4. The tilt-lock means 18 includes a member 20 which is fixed to the vehicle body 4 and a U-shaped bracket 22 which is fixed to the member 20. The U-shaped bracket 22 opens downward and includes right and left legs 24. A vertically elongate hole 26 is formed in each leg 24 of the U-shaped bracket 22. The elongate hole 26 which extends vertically is formed along an arc having an arc center at the tilt center 16. A lock bolt 28 passes through the elongate hole 26 and slidably engages the elongate hole 26. A tilt lever 30 is rotatably threaded to one end of the lock bolt 28. The tilt-lock means 18 supports the column tube assembly 2 such that the column tube assembly 2 can tilt around the tilt center 16 when the lock bolt 28 is loosened and such that tilting position of the column tube assembly 2 is locked when the lock bolt 28 is tightened. More specifically, when the tilt lever 30 is rotated between the positions I and J in FIG. 1, the distance between the tilt lever 30 and the head of the lock bolt 28 in the axial direction of the lock bolt 28 is varied, whereby the distance between the legs 24 and 24 of the U-shaped bracket 22 is varied. Since an attachment fixed to an upper portion of an energy absorbing bending bracket and a collar fixed to the attachment (which will be explained hereinafter) are interposed between the legs 24 and 24 of the bracket 22, when the lock bolt 28 is tightened by rotating the lock lever 30 in a locking direction, the attachment and the collar are squeezed between both the legs 24 and 24 of the bracket 22 and, as a result, vertical movement of the attachment and the collar is restricted and the tilting position of the column tube assembly 2 is locked. Conversely, when the lock bolt 28 is loosened by rotating the lock lever 30 in an unlocking direction, the tilting position of the column tube assembly 2 is unlocked. When the column tube assembly 2 tilts around the tilt center 16 in the direction of arrow K in FIG. 1, the lock bolt 28 moves along the elongate hole 26 relative to the tilt-lock means 18.

For the purpose of preventing the column tube assembly 2 from freely rotating downward due to gravity when the lock bolt 28 is loosened, a return spring 70 is provided between the tilt-lock means 18 and the column tube assembly 2. The return spring 70 is a coil spring having one end locked in the upper column tube 8 and another end hooked onto a lower end portion of the tilt-lock means 18. When the tilt-lock means 18 is unlocked, the column tube assembly 2 can maintain its neutral position or may move a little upward while receiving an upward energizing force from the return spring 70.

An energy absorbing bending bracket 32 includes a first fixing portion 34, a first bent portion 36, a second bent portion 38, and a second fixing portion 40. The energy absorbing bending bracket 32 is fixed to the upper column tube 8 at the first fixing portion 34 by welding. The energy absorbing bending bracket 32 extends obliquely downward and frontward from the first fixing portion 34 to the first bent portion 36 where the bracket 32 is folded obliquely upward. The energy absorbing bending bracket 32 further extends obliquely upward and frontward from the first bent portion 36 to the second bent portion 38 where the bracket 32 is folded frontward. The energy absorbing bending bracket 32 further extends frontward from the second bent portion 38 and forms the second fixing portion 40 which extends in parallel with the axis of the column tube assembly 2.

An attachment 80 is fixed to the second fixing portion 40 of the energy absorbing bending bracket 32 and a collar 42 is fixed to the attachment 80. The second fixing portion 40 of the energy absorbing bending bracket 32, the attachment 80 and the collar 42 are interposed between the legs 24 and 24 of the U-shaped bracket 22 so that relative movement of these members 40, 80 and 42 with respect to the U-shaped bracket 22 is locked/unlocked by tightening/loosening the lock bolt 28. When the second fixing portion 40 of the energy absorbing bending bracket 32 is locked with the U-shaped bracket 22 and the upper column tube 8 moves frontward at a time of a front impact on the vehicle, the energy absorbing bending bracket 32 deforms and absorbs the shock energy by the permanent deformation thereof, mainly the permanent deformation of the first bent portion 36 and the second bent portion 38.

The attachment 80 is formed in a U-shape and opens downward. The U-shaped attachment 80 has a right leg and a left leg. The collar 42 is formed in a U-shape opening upward and has a front leg 44 and a back leg 46. The right and left edges of the legs 44 and 46 of the collar 42 are respectively fixed to the right and left legs of the attachment 80. The front leg 44 of the collar 42 is bent frontward at an intermediate portion thereof. As will be explained in detail hereinafter, the front leg 44 is slidably held between an inclined surface of a guide bracket and a holding support.

Figure 3:
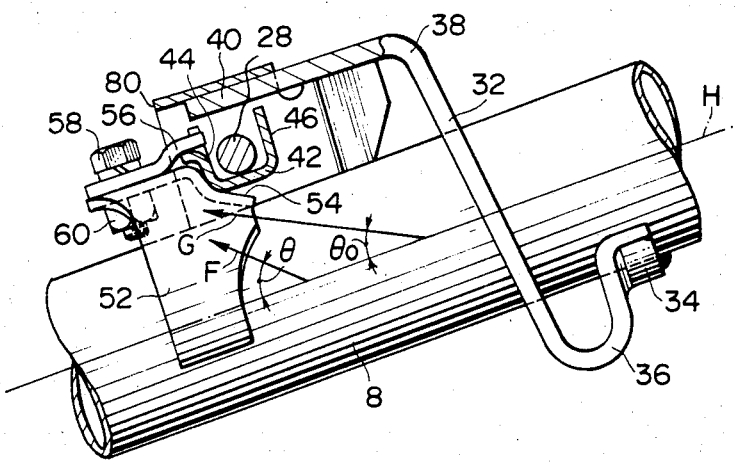
FIG. 3 is a side view of the tilt-lock means and the vicinity thereof in the device of FIG. 1 wherein an upper column tube has not moved.
Figure 4:
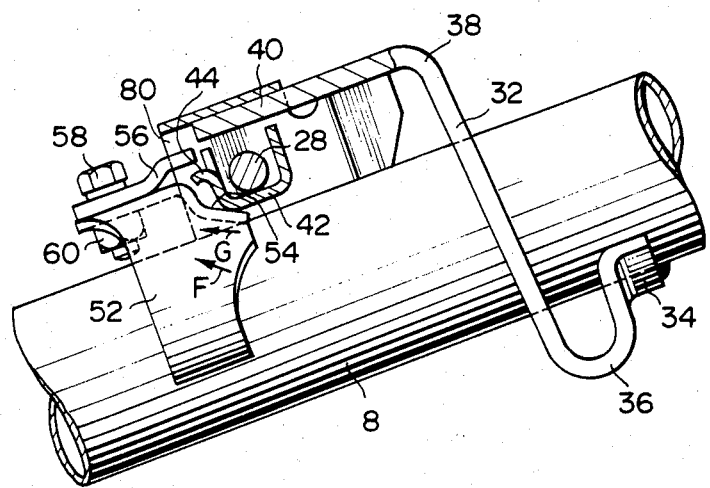
FIG. 4 is a side view of the tilt-lock means and the vicinity thereof in the device of FIG. 1 wherein the upper column tube is moving frontward.
Figure 5:
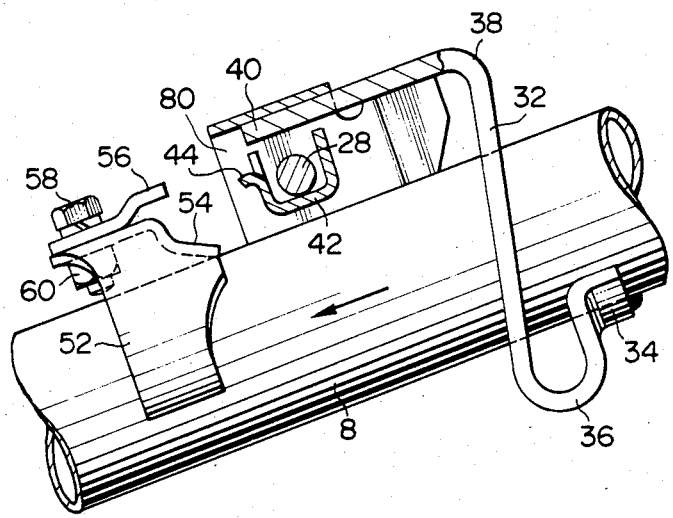
FIG. 5 is a side view of the tilt-lock means and the vicinity thereof in the device of FIG. 1 wherein the upper column tube has moved sufficiently frontward.
Figure 6:
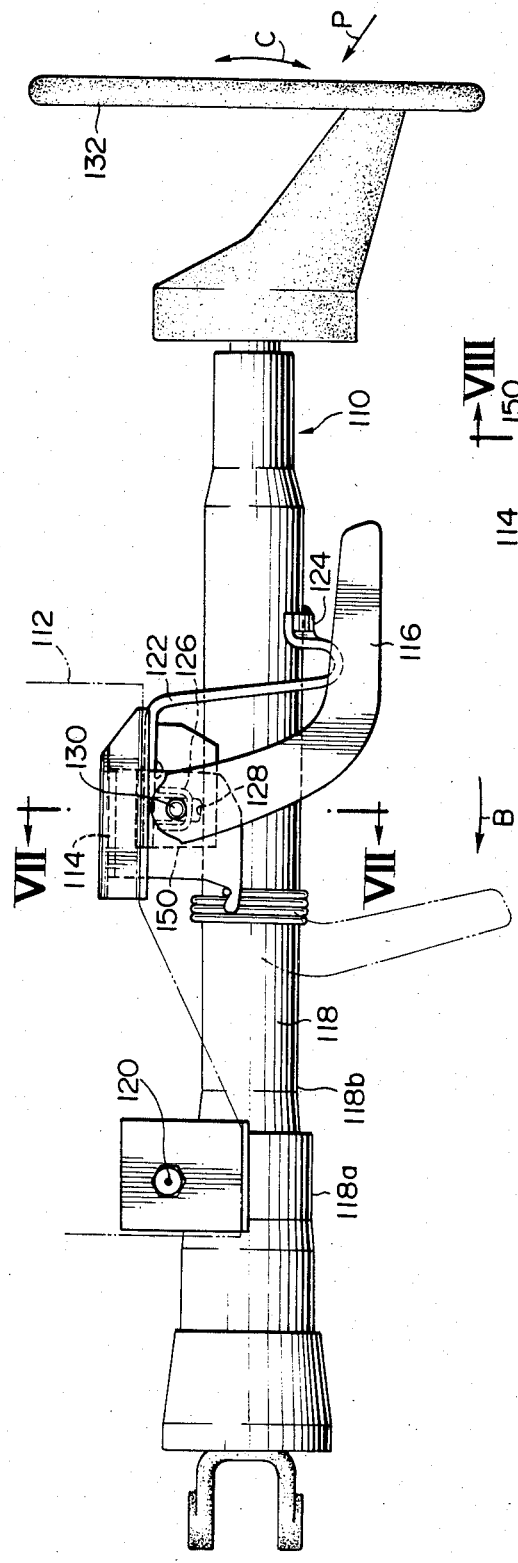
FIG. 6 is a side view of a hypothetical tilt steering column device which might be obtained by combining a tilt steering column device of SHO 60-6670 and a conventional energy absorbing bending bracket.
Figure 7:
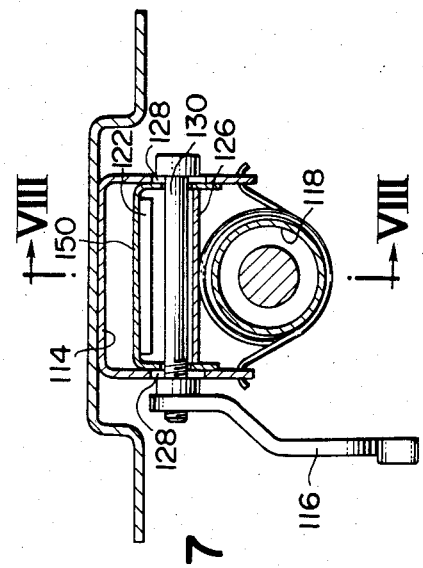
FIG. 7 is a sectional view taken along line VII—VII of FIG. 6.
Figure 8:
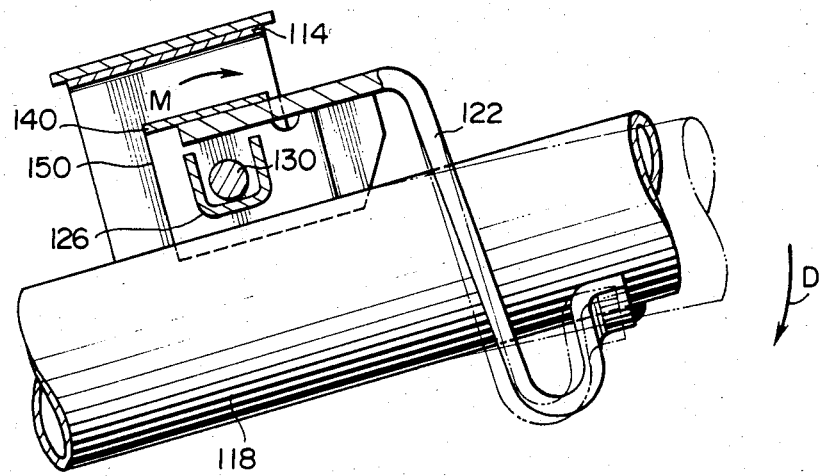
FIG. 8 is a sectional view taken along line VIII—VIII of FIG. 7.
Figure 9:
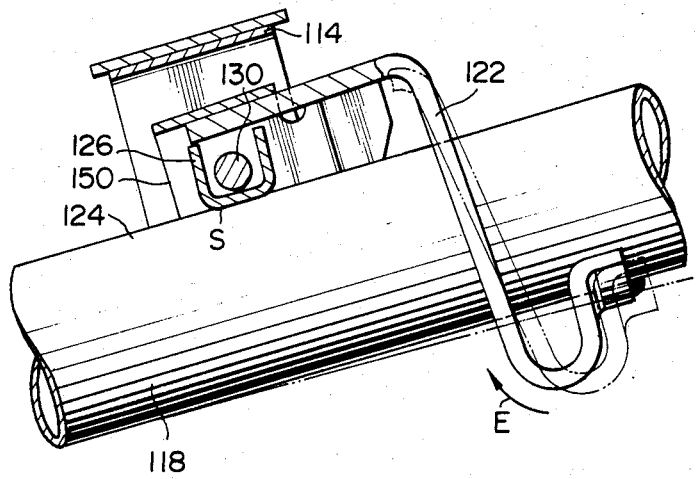
FIG. 9 is a side view of the device of FIG. 6 wherein an upper column tube has moved partially frontward and interferes with a collar.
Figure 10:
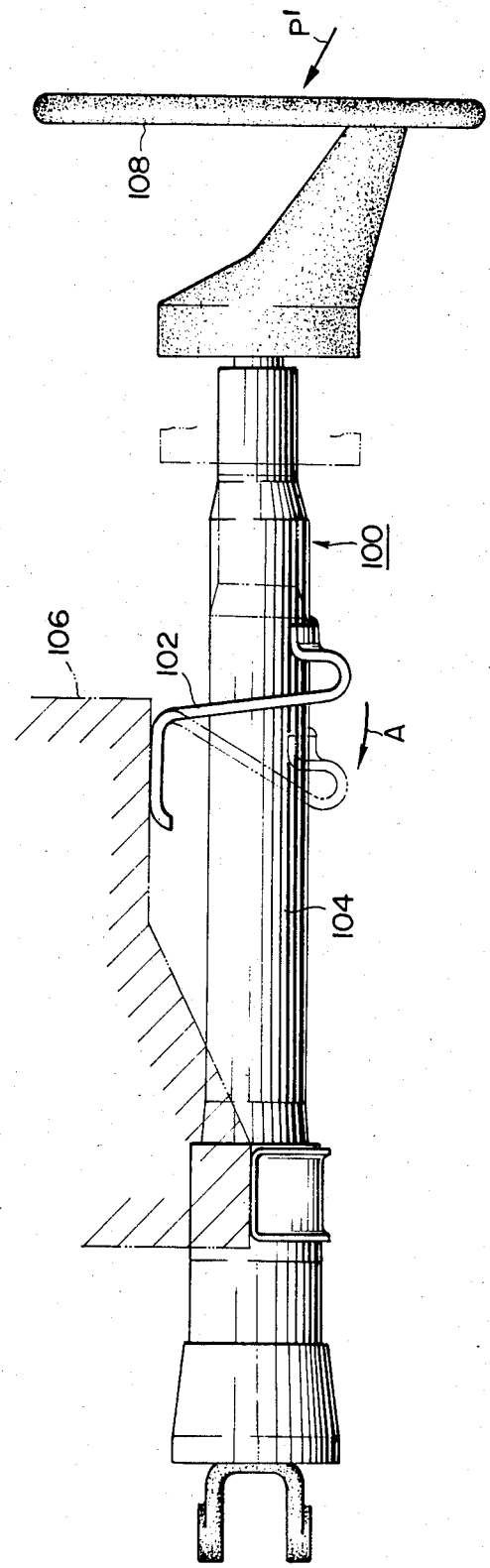
FIG. 10 is a side view of a conventional non-tilt steering column device with an energy absorbing bending bracket.

The second fixing portion 40 of the energy absorbing bending bracket 32 and the collar 42 together form an enclosed space through which the lock bolt 28 passes. The enclosed space is closed in section except for the clearance defined between upper surface of the front leg 44 of the collar 42 and the lower surface of the second fixing portion 40 of the energy absorbing bending bracket 32, and except for the clearance defined between the upper edge of the back leg 46 of the collar 42 and the lower surface of the second fixing portion 40 of the energy absorbing bending bracket 32, as shown in FIGS. 3-5. A circular hole is formed in each leg of the attachment 80 and the lock bolt 28 passes through each circular hole which has substantially the same diameter as that of the shank portion of the lock bolt 28. The engagement of the lock bolt 28 with the circular holes formed in the attachment 80 prevents the lock bolt 28 from moving relative to the collar 42. When the column tube assembly 2 tilts and the lock bolt 28 moves along the elongate holes 26 formed in the tilt-lock means 18, the assembly of the collar 42, the attachment 80, and the energy absorbing bending bracket 32 tilts around the tilt center 16 with respect to the U-shaped bracket 22 of the tilt-lock means 18.

A guide bracket 52 is fixed to the upper column tube 8 at a position nearer to the lower column tube 6 than that of the energy absorbing bending bracket 32. The guide bracket 52 has a high rigidity. The guide bracket 52 includes an inclined surface 54 which is in facing opposition to the collar 42 and is so inclined with respect to the axis of the column tube assembly 2 as to extend upward and frontward. As shown in FIG. 3, the inclination of the inclined surface 54 is so designed that an angle $\theta_0$ defined between the direction G of the inclined surface 54 and the axis H of the column tube assembly 2 is smaller than an angle $\theta$ defined between the direction F of the input pushing force on the upper column tube 8 at the beginning of movement of the upper column tube 8 and the axis H of the column tube assembly 2.

A holding support 56 is fixed to the guide bracket 52 by means of a bolt 58 and a nut 60. The holding support 56 extends above the inclined surface 54. The holding support 56 extends toward the collar 42 by a distance less than does the inclined surface 54. The inclined surface 54 and the holding support 56 are slidably contacted by the lower surface and the upper surface of the front leg 44 of the U-letter fashion collar 42, respectively. The front leg 44 of the collar 42 is normally vertically held between the inclined surface 54 and the holding support 56, and thus the guide bracket 52 and the holding support 56 closely vertically hold the column tube assembly 2 via the collar 42.

The vertical distance between the inclined surface 54 of the guide bracket 52 and the lower surface of the holding support 56 is gradually increased toward the collar 42 and the energy absorbing bracket 32. The space between the inclined surface 54 and the holding support 56 thus opens toward the collar 42 and the energy absorbing bending bracket 32. Accordingly, when the upper column tube 8 moves frontward upon receiving an excessively large frontward force from a driver at the time of a front impact on a vehicle, the guide bracket 52 and the holding support 56 move frontward together with the upper column tube 8 and, as a result, the collar 42 disengages from the guide bracket 52 and the holding support 56. FIG. 4 shows the state where the collar 42 is disengaging and FIG. 5 shows the state where the collar 42 has fully disengaged.

Next, the operation and effect of the tilt steering column device according to the present invention will be explained.

A tilt position of the steering column assembly 2 can be adjusted by loosening the lock bolt 28 through rotating the tilt lever 30 in an unlocking direction and then tilting the steering column assembly 2 around the tilt center 16 to a desired position. During the tilting of the column tube assembly 2, the lock bolt 28 moves in the elongate hole 26 formed in the U-shaped bracket 22 of the tilt-lock means 18. Simultaneously, the assembly of the energy absorbing bending bracket 32, the attachment 80, the collar 42, the guide bracket 52 and the holding support 56 tilts around the tilt center 16 together with the upper column tube 8. Though the lock bolt 28 is loosened, the column tube assembly 2 is prevented from rotating freely downward due to gravity by means of the return spring 70.

The tilt position of the column tube assembly 2 is locked by rotating the tilt lever 30 in a locking direction and so tightening the lock bolt 28. Thus, the column tube assembly 2 is supported by the lower support bracket 14 and the tilt-lock means 18. Since the collar 42 which is supported by the tilt-lock means 18 is held between the inclined surface 54 of the guide bracket 52 and the holding support 56, the tilt-lock means 18 directly supports the upper column tube 8 without the intermediary of the energy absorbing bending bracket 32. Therefore, the rigidity of the support for the column tube assembly 2 is very high and the intrinsic resonance frequency of the steering column system is increased by 5-6 Hz, whereby the problem of vibration of the tilt steering column device is solved. Further, since the vertical force component of the pushing force on the column tube assembly 2 from a driver is supported by the above-mentioned direct support mechanism, a moment around the tilt-lock means 18 is not generated and the problem of slip around the tilt-lock means 18 does not occur.

When the steering wheel 10 receives an excessively large frontward force from a driver at the time of a front impact on a vehicle, the upper column tube 8 receives the frontward force from the steering wheel 10 via the steering shaft 12 and is forcibly moved frontward with respect to the lower column tube 6. When the upper column tube 8 so moves frontward, the energy absorbing bending bracket 32 deforms from the state of FIG. 3, through the state of FIG. 4, to the state of FIG. 5. The deformation is beyond the range of elastic deformation and is in a range of permanent deformation. The energy absorbing bending bracket 32 permanently deforms mainly at the first bent portion 38 and the second bent portion 36, and so a large amount of energy is absorbed by the permanent deformation whereby the shock is decreased and a driver is protected from the impact force of the steering wheel 10.

When the upper column tube 8 moves frontward while receiving an excessively large frontward force which acts in the direction F in FIG. 3, the movement of the upper column tube 8 is directed toward the direction G in FIG. 3, because the inclined surface 54 of the guide bracket 52 slidably contacts the collar 42. The direction G is nearer to the direction of the axis H of the column tube assembly 2 than the direction F of the pushing force. Therefore, the upper column tube 8 moves frontward in a direction which is nearer to the axis H of the column tube assembly 2 than does the upper column tube 118b of FIG. 6. As a result, the upper column tube 8 can move over a large distance without interfering with the collar 42. This means that the energy absorbing bending bracket 32 can also deform to a great extent and the amount of absorbed energy is increased. The impact force on a driver from the steering wheel 10 will be decreased by about 100-200 Kg according to the present invention. Further, movement of the upper column tube 8 in a direction near to the axis H of the column tube assembly 2 makes it easy for the upper column tube to move smoothly without receiving a high abrasion force from the tilt-lock means 18.

Since the distance between the inclined surface 54 of the guide bracket 52 and the holding support 56 is increased as one moves toward the collar 42 and the energy absorbing bending bracket 32, disengagement of the guide bracket 52 and the holding support 56 from the collar 42 can be carried out smoothly and the operation is reliable.

Further, since the holding support 56 is fastened to the guide bracket 52 by means of the bolt 58 and the nut 60, the assembling of the front leg 44 of the collar 42 between the guide bracket 52 and the holding support 56 is very easy.

Although only one exemplary embodiment of the present invention has been described in detail above, those skilled in the art will readily appreciate that many modifications are possible in the exemplary embodiment without departing from the novel teachings and advantages of the invention. Accordingly, all such modifications are intended to be included within the scope of the present invention as defined in the following claims.

What is claimed is:

1. A tilt steering column device including a bending bracket type energy absorbing means for a vehicle, comprising:
    (a) a column tube assembly including a lower column tube and an upper column tube which are mutually mounted such that said upper column tube can move axially frontward with respect to said lower column tube when said upper column tube receives an excessively large frontward force;
    (b) lower support bracket means for so supporting said column tube assembly at said lower column tube that said column tube assembly can tilt around a tilt center, said lower support bracket means being fixed to a vehicle body;
    (c) tilt-lock means for locking/unlocking a tilting position of said column tube assembly, said tilt-lock means being fixed to said vehicle body and including means having an elongate hole and a lock bolt slidably passing through said elongate hole, said tilt-lock means comprising means for so supporting said column tube assembly at said upper column tube that said column tube assembly can tilt around said tilt center when said lock bolt is loosened and that a tilting position of said column tube assembly is locked when said lock bolt is tightened;
    (d) return spring means for so supporting said column tube assembly that said column tube assembly does not freely rotate downward due to gravity when said lock bolt is loosened, said return spring means comprising a spring engaging said tilt lock means and said column tube assembly;
    (e)
        (e-1) an energy absorbing bending bracket for absorbing energy by a permanent deformation thereof when said upper column tube moves axially frontward with respect to said lower column tube, said energy absorbing bending bracket having one end fixed to said upper column tube,
        (e-2) an attachment fixed to an other end of said energy absorbing bending bracket, and means including said lock bolt for releasably supporting said attachment by said tilt-lock means such that relative movement of said attachment with respect to said tilt-lock means during tilting of said column tube assembly is accomplished by loosening said lock bolt,
        (e-3) a collar fixed to said attachment; and
    (f)
        (f-1) a guide bracket fixed to said upper column tube, said guide bracket including an inclined surface, an angle defined between said inclined surface and an axis of said column tube assembly being smaller than an angle defined between the direction of an initial portion of the movement of said upper column tube due to said excessively large frontward force and said axis of said column tube assembly,
        (f-2) a holding support fixed to said guide bracket, said collar being vertically held between said holding support and said guide bracket, said guide bracket being positioned relative to said tilt-lock means such that said collar slides along said inclined surface of said guide bracket during said axially frontward movement of said upper column tube.

2. The tilt steering column device according to claim 1 wherein said tilt-lock means includes a U-shaped bracket opening downward, one said long hole being formed in each leg of said U-shaped bracket, said lock bolt slidably passing through said elongate holes and having a tilt lever rotatably threaded to one end thereof.

3. The tilt steering column device according to claim 1 wherein said energy absorbing bending bracket includes a first fixing portion, a first bent portion, a second bent portion and a second fixing portion, said energy absorbing bending bracket being fixed to said upper column tube at said first fixing portion, extending obliquely downward from said first fixing portion to said first bent portion, extending obliquely upward from said first bent portion to said second bent portion, extending frontward from said second bent portion to form said second fixing portion which extends in parallel with said axis of said column tube assembly, and being fixed to said attachment at said second fixing portion.

4. The tilt steering column device according to claim 3 wherein said collar comprises a U-shaped collar opening upward, right and left edges of said U-shaped collar being respectively fixed to said attachment, a front leg of said U-shaped collar being bent frontward at an intermediate portion thereof and being slidably held by said inclined surface of said guide bracket and said holding support.

5. The tilt steering column device according to claim 4 wherein said second fixing portion of said energy absorbing bending bracket and said collar together define an enclosed space, said lock bolt passing through said enclosed space and penetrating circular holes formed in said attachment, an assembly of said energy absorbing bending bracket, said attachment and said collar being tilted around said tilt center when said column tube assembly is tilted around said tilt center.

6. The tilt steering column device according to claim 1 wherein said holding support is fixed to said guide bracket by means of a bolt and a nut.

7. The tilt steering column device according to claim 1 wherein a distance between said holding support and said inclined surface of said guide bracket gradually increases in a direction toward said collar and said energy absorbing bending bracket.

* * * * *

UNITED STATES PATENT AND TRADEMARK OFFICE
CERTIFICATE OF CORRECTION

PATENT NO. : 4,733,575

DATED : Mar. 29, 1988

INVENTOR(S) : Shuji NAKAMURA

It is certified that error appears in the above-identified patent and that said Letters Patent is hereby corrected as shown below:

ON THE TITLE PAGE:

The following Foreign Application Priority Data should be listed:

-- Apr. 17, 1986 [JP]   Japan ............... 61-056823[U] --

Signed and Sealed this

Sixteenth Day of August, 1988

Attest:

DONALD J. QUIGG

Attesting Officer

Commissioner of Patents and Trademarks